US012705369B2

(12) United States Patent
Wu et al.

(10) Patent No.: US 12,705,369 B2
(45) Date of Patent: Aug. 11, 2026

(54) DATA PROCESSING METHODS, APPARATUSES, AND DEVICES

(71) Applicant: Alipay (Hangzhou) Information Technology Co., Ltd., Zhejiang (CN)

(72) Inventors: Chao Wu, Hangzhou (CN); Xiaofei Wan, Hangzhou (CN); Zhi Xin, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 255 days.

(21) Appl. No.: 18/336,832

(22) Filed: Jun. 16, 2023

(65) Prior Publication Data

US 2023/0409718 A1 Dec. 21, 2023

(30) Foreign Application Priority Data

Jun. 17, 2022 (CN) ......................... 202210717493.5

(51) Int. Cl.
*G06F 21/60* (2013.01)
*G06F 21/57* (2013.01)
*H04L 9/14* (2006.01)

(52) U.S. Cl.
CPC ............ *G06F 21/602* (2013.01); *G06F 21/57* (2013.01); *G06F 2221/033* (2013.01); *H04L 9/14* (2013.01)

(58) Field of Classification Search
CPC .. G06F 21/602; G06F 21/57; G06F 2221/033; H04L 9/14; H04L 2209/127
See application file for complete search history.

(56) References Cited

U.S. PATENT DOCUMENTS 9,875,368 B1 * 1/2018 Willden .................. G06F 21/62
11,895,247 B2 * 2/2024 Smith ................. H04W 12/069
2014/0089667 A1 3/2014 Arther et al.
2019/0005229 A1 * 1/2019 Hlaing .................... G06F 9/445
2019/0340393 A1 * 11/2019 Mo ....................... G06F 21/554
(Continued)

FOREIGN PATENT DOCUMENTS

CN 111625829 A * 9/2020 ........... G06F 21/602
CN 112199661 A * 1/2021 ........... G06F 21/445
(Continued)

OTHER PUBLICATIONS

Towards Efficient Fine-Grained Access Control and Trustworthy Data Processing for Remote Monitoring Services in IoT (Year: 2019).*
(Continued)

*Primary Examiner* — Philip J Chea
*Assistant Examiner* — Jasmine Mochen Day
(74) *Attorney, Agent, or Firm* — Fish & Richardson P.C.

(57) ABSTRACT

Some embodiments of this specification provide data processing methods, apparatuses, and devices. One method includes: receiving encrypted debugging information and an encrypted first key from a client device, determining the device key corresponding to the client device, obtaining the debugging information based on the device key, the encrypted debugging information, and the encrypted first key, and performing abnormality detection on the trusted execution environment of the client device based on the debugging information to determine an abnormality detection result for the trusted execution environment.

12 Claims, 8 Drawing Sheets

(56) References Cited

U.S. PATENT DOCUMENTS

| | | | | |
|---|---|---|---|---|
| 2021/0342463 | A1* | 11/2021 | Tsirkin | H04L 63/123 |
| 2022/0309502 | A1* | 9/2022 | Ortiz | G06Q 20/204 |
| 2024/0031129 | A1* | 1/2024 | Li | H04L 9/0869 |
| 2024/0388453 | A1* | 11/2024 | Zheng | H04L 63/18 |

FOREIGN PATENT DOCUMENTS

| | | | | | |
|---|---|---|---|---|---|
| CN | 112711774 | A | * | 4/2021 | G06F 21/602 |
| CN | 114257382 | | | 3/2022 | |
| CN | 114629639 | A | * | 6/2022 | H04L 63/0442 |

OTHER PUBLICATIONS

Visualization of Trusted Multi-Clients Monitoring with TPM (Year: 2010).*

Extended European Search Report in European Appln. No. 23179887.7, mailed on Oct. 12, 2023, 8 pages.

* cited by examiner

Server

Abnormality detection result

Debugging information

Decrypt encrypted debugging information

Generate a device key

Decrypt an encrypted first key

TEE

Generate a first key

Encrypt the first key based on the device key

Encrypt the debugging information based on the first key

REE

The encrypted first key

The encrypted debugging information

DATA PROCESSING METHODS, APPARATUSES, AND DEVICES

CROSS-REFERENCE TO RELATED APPLICATIONS

This application claims priority to Chinese Patent Application No. 202210717493.5, filed on Jun. 17, 2022, which is hereby incorporated by reference in its entirety.

TECHNICAL FIELD

This specification relates to the field of data processing technologies, and in particular, to data processing methods, apparatuses, and devices.

BACKGROUND

With the continuous development of computer technologies, terminal devices have become necessities in people's life and work. To improve data security of the terminal device, data storage and processing can be implemented using a trusted execution environment (TEE) in the terminal device.

However, if a problem such as lagging occurs in an application running in the TEE, the user needs to report the problem, and then related personnel track and locate the problem that occurs in the TEE based on the running data of the application. When there are many applications, the above-mentioned method causes poor efficiency and accuracy of tracking and locating the problem that occurs in the TEE. Therefore, there is a need to provide a solution capable of improving efficiency and accuracy of tracking and locating a problem that occurs in a trusted execution environment of a terminal device.

SUMMARY

Some embodiments of this specification are intended to provide a solution capable of improving efficiency and accuracy of tracking and locating a problem that occurs in a trusted execution environment of a terminal device.

To implement the above-mentioned technical solution, some embodiments of this specification are described as follows:

According to a first aspect, some embodiments of this specification provide a data processing method. The method is applied to a client device and includes: acquiring a running state of a target application in a trusted execution environment; if it is determined that the target application runs abnormally in the trusted execution environment based on the running state, acquiring a first key and a device key, and debugging information, generated in the trusted execution environment, corresponding to the target application in the trusted execution environment, where the device key is a key generated by a server based on a client device; encrypting the debugging information based on the first key in the trusted execution environment to obtain encrypted debugging information, and encrypting the first key based on the device key to obtain an encrypted first key; and sending the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

According to a second aspect, some embodiments of this specification provide a data processing method. The method is applied to a server and includes: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment.

According to a third aspect, some embodiments of this specification provide a data processing apparatus, including: a state acquisition module, configured to acquire a running state of a target application in a trusted execution environment; a data acquisition module, configured to: if it is determined that the target application runs abnormally in the trusted execution environment based on the running state, acquire a first key and a device key, and debugging information, generated in the trusted execution environment, corresponding to the target application in the trusted execution environment, where the device key is a key generated by a server based on the client device; an encryption module, configured to encrypt the debugging information based on the first key in the trusted execution environment to obtain encrypted debugging information, and encrypt the first key based on the device key to obtain an encrypted first key; and a sending module, configured to send the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

According to a fourth aspect, some embodiments of this specification provide a data processing apparatus, including: an information receiving module, configured to receive encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; a data determination module, configured to determine the device key corresponding to the client device, and obtain the debugging information based on the determined device key, the encrypted debugging information, and the encrypted first key; and an abnormality detection module, configured to perform abnormality detection on the trusted execution environment of the client device based on the debugging information to determine an abnormality detection result for the trusted execution environment.

According to a fifth aspect, some embodiments of this specification provide a data processing device. The data processing device includes: a processor; and a memory configured to store a computer-executable instruction, where when the executable instruction is executed, the processor is enabled to: acquire a running state of a target application in a trusted execution environment; if it is determined that the target application runs abnormally in the trusted execution environment based on the running state, acquire a first key and a device key, and debugging information, generated in the trusted execution environment, corresponding to the target application in the trusted execution environment, where the device key is a key generated by a server based on a client device; encrypt the debugging information based on the first key in the trusted execution environment to obtain encrypted debugging information, and encrypt the first key based on the device key to obtain an encrypted first key; and send the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

According to a sixth aspect, some embodiments of this specification provide a data processing device. The data processing device includes: a processor; and a memory configured to store a computer-executable instruction, where when the executable instruction is executed, the processor is enabled to: receive encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determine the device key corresponding to the client device, and obtain the debugging information based on the determined device key, the encrypted debugging information, and the encrypted first key; and perform abnormality detection on the trusted execution environment of the client device based on the debugging information to determine an abnormality detection result for the trusted execution environment.

According to a seventh aspect, some embodiments of this specification provide a storage medium, where the storage medium is configured to store a computer-executable instruction, and the executable instruction is executed to implement the following procedure: acquiring a running state of a target application in a trusted execution environment; if it is determined that the target application runs abnormally in the trusted execution environment based on the running state, acquiring a first key and a device key, and debugging information, generated in the trusted execution environment, corresponding to the target application in the trusted execution environment, where the device key is a key generated by a server based on a client device; encrypting the debugging information based on the first key in the trusted execution environment to obtain encrypted debugging information, and encrypting the first key based on the device key to obtain an encrypted first key; and sending the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

According to an eighth aspect, some embodiments of this specification provide a storage medium, where the storage medium is configured to store a computer-executable instruction, and the executable instruction is executed to implement the following procedure: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment.

BRIEF DESCRIPTION OF DRAWINGS

To describe the technical solutions in some embodiments of this specification or in an existing technology more clearly, the following briefly describes the accompanying drawings needed for describing the some embodiments or the existing technology. Clearly, the accompanying drawings in the following descriptions merely show some embodiments of this specification, and a person of ordinary skill in the art can still derive other drawings from these accompanying drawings without creative efforts.

DESCRIPTION OF EMBODIMENTS

Some embodiments of this specification provide data processing methods, apparatuses, and devices.

To make a person skilled in the art better understand the technical solutions in this specification, the following clearly and fully describes the technical solutions in some embodiments of this specification with reference to the accompanying drawings in some embodiments of this specification. Clearly, the described embodiments are merely some but not all of the embodiments of this specification. All other embodiments obtained by a person of ordinary skill in the art based on the some embodiments of this specification without creative efforts shall fall within the protection scope of this specification.

Embodiment 1

Figure 1A:
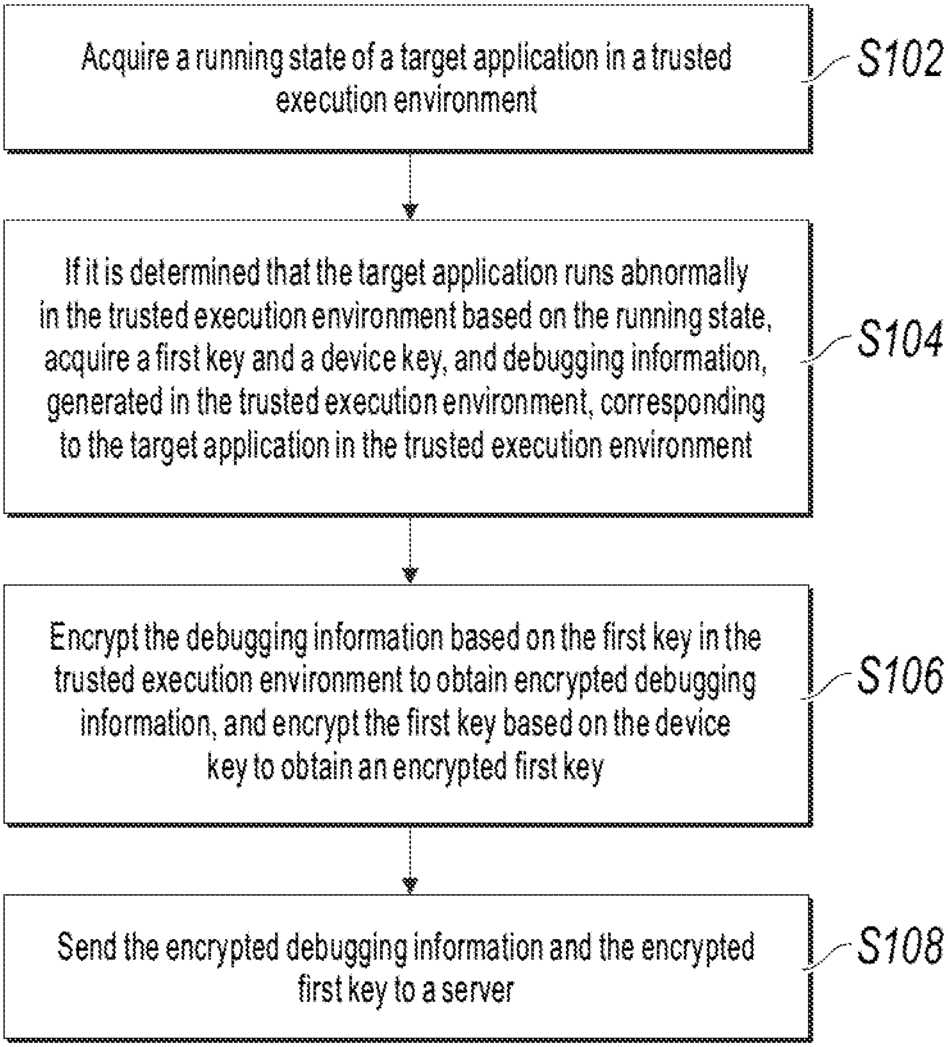
FIG. 1A is a flowchart illustrating a data processing method, according to some embodiments of this specification.
Figure 1B:
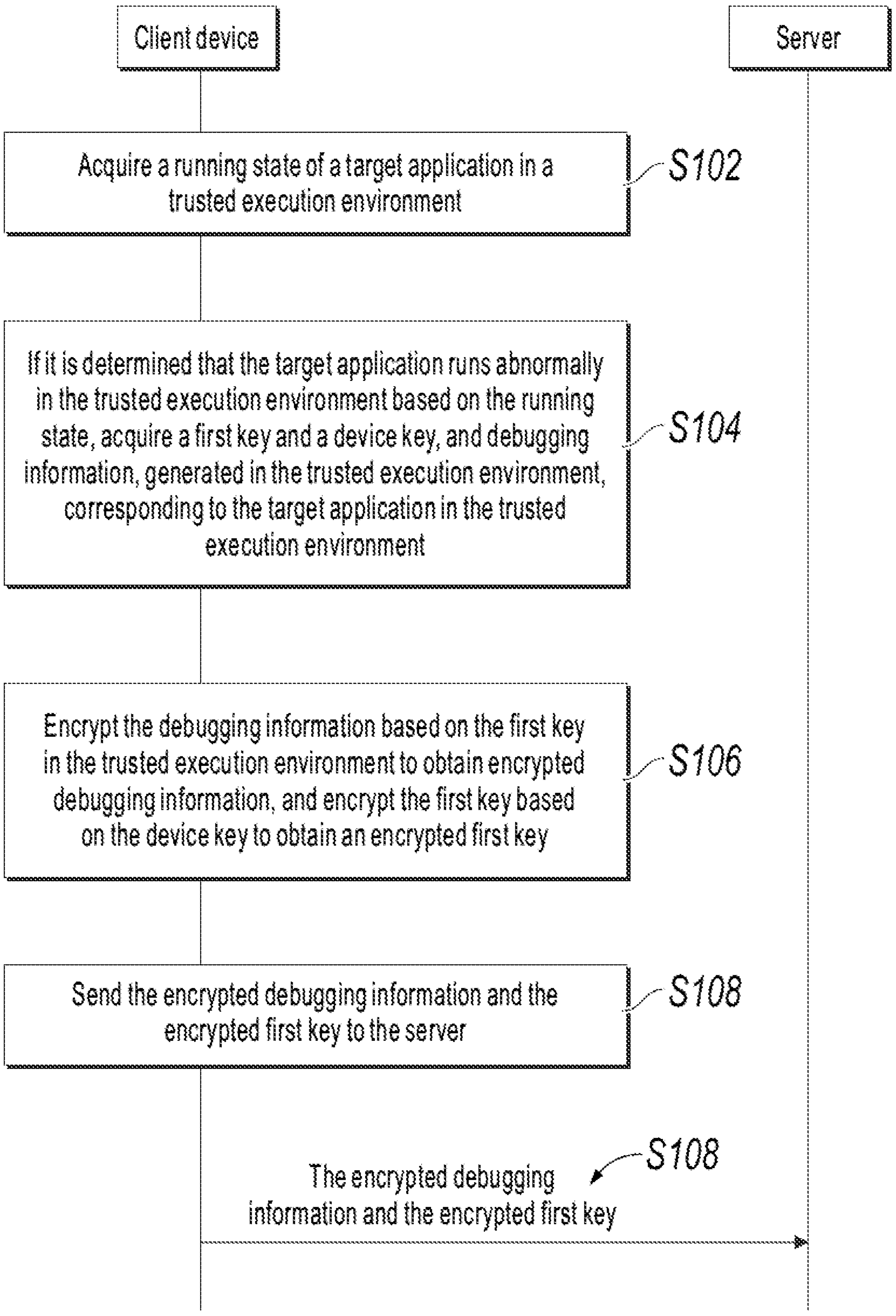
FIG. 1B is a schematic diagram illustrating a processing procedure of a data processing method, according to this specification.

As shown in FIG. 1A and FIG. 1B, some embodiments of this specification provide a data processing method. The method can be performed by a client device, and the client device can be a terminal device. The terminal device can be a mobile terminal device such as a mobile phone or a tablet computer, and the terminal device can include a trusted execution environment (TEE). The method can specifically include the following steps:

S102: Acquire a running state of a target application in a trusted execution environment.

The client device can include a trusted execution environment (TEE). The TEE can be a secure area separated from a rich execution environment (REE) on a digital processor (such as a CPU) of the client device. The TEE includes a trusted application (TA) and a trusted operating system (TOS). The TEE is separated from the REE and applications of the REE so that sensitive data are stored, processed, and protected in a trusted environment so as to ensure confidentiality and integrity of data and code. In addition, the TEE provides a secure execution environment for a client application (CA) loaded therein to implement data processing related to security and privacy, such as secure storage and secure computing. The TEE runs concurrently with the REE and can interact with the REE through a secure API. The target application can be any trusted application that can run in the trusted execution environment. For example, the target application can be a resource transfer application in the TEE, an instant messaging application, etc. A running state of the target application in the trusted execution environment can include “normal running”, “running lagging”, “no response”, etc. The running state of the target application can be determined by related data of the target application in the running process. For example, if response duration of the target application to an instruction triggered by a user exceeds a predetermined duration range, the running state of the target application can be “running lagging” or “no response”.

In some implementations, with the continuous development of computer technologies, terminal devices have become necessities in people’s life and work. To improve data security of the terminal device, data storage and processing can be implemented using a trusted execution environment (TEE) in the terminal device. However, if a problem such as lagging occurs in an application running in the TEE, the user needs to report the problem, and then related personnel track and locate the problem that occurs in the TEE based on the running data of the application. When there are many applications, the above-mentioned method causes poor efficiency and accuracy of tracking and locating the problem that occurs in the TEE. Therefore, there is a need to provide a solution capable of improving efficiency and accuracy of tracking and locating a problem that occurs in a trusted execution environment of a terminal device. In view of the above-mentioned description, some embodiments of this specification provide a technical solution capable of alleviating the above-mentioned problems. References can be made to the following description for details.

If the client device detects on the REE side that the target application is started in the TEE, the client device can acquire running data of the target application in the TEE based on a predetermined detection period to determine the running state of the target application in the TEE.

For example, if the client device detects on the REE side that the target application is started in the TEE, the client device can acquire the response duration of the target application to the instruction triggered by the user once every minute. If the response duration is within a first predetermined duration range (which can be, for example, less than 10 seconds), the client device can determine that the running state of the target application in the TEE is “normal running”. If the response duration is within a second predetermined duration range (which can be, for example, not less than 10 seconds but less than 60 seconds), the client device can determine that the running state of the target application in the TEE is “running lagging”. If the response duration is within a third predetermined duration range (which can be, for example, not less than 60 seconds), the client device can determine that the running state of the target application in the TEE is “no response”.

The type and determination method of the running state of the target application in the TEE is an optional and implementable determination method. In some actual application scenarios, there can be many different types and determination methods, and different types and/or determination methods can be selected based on different actual application scenarios, which is not specifically limited in some embodiments of this specification.

S104: If it is determined that the target application runs abnormally in the trusted execution environment based on the running state, acquire a first key and a device key, and debugging information, generated in the trusted execution environment, corresponding to the target application in the trusted execution environment.

The device key can be a key generated by the server based on the client device, the first key can be a key generated by the client device in the TEE, the first key can be a key (such as a symmetric key) or can be a pair of keys (such as asymmetric keys), the device key can be a symmetric key or can be an encryption key in the asymmetric keys, and the debugging information is a symbol for assisting a debugger in analyzing and debugging a layout of a debugged program, that is, the debugging information can help the debugger locate a variable and a function address, display a variable value (including a complex structure such as a structure body or a class), and can map the address to a line of the source code. The debugging information can include log data for running the target application. To be specific, a problem can be tracked and located using the debugging information corresponding to the target application.

In some implementations, for example, the running state includes “normal running”, “running lagging”, and “no response”. If the running state is “running lagging” or “no response”, it can be determined that the target application runs abnormally in the trusted execution environment. Alternatively, if the running state of the target application does not include “no response” within a predetermined judgment period, and a quantity of times when the running state of the target application is “running lagging” exceeds a predetermined lagging threshold, it can be determined that the target application runs abnormally in the trusted execution environment.

The above-mentioned method for determining whether the target application runs abnormally in the TEE is an optional and implementable determination method. In some actual application scenarios, there can be many different determination methods, and different determination methods can be selected based on different actual application scenarios, which is not specifically limited in some embodiments of this specification.

In the case of determining that the target application runs abnormally in the trusted execution environment based on the running state, the debugging information corresponding to the target application can be acquired from the debugging information generated by the TEE so that the server can track and locate the problem that occurs in the TEE based on the debugging information.

In addition, the first key can be a random key generated in the TEE so as to ensure security of the data during transmission through one-time pad.

S106: Encrypt the debugging information based on the first key in the trusted execution environment to obtain encrypted debugging information, and encrypt the first key based on the device key to obtain an encrypted first key.

In some implementations, if the first key is an asymmetric key, the debugging information can be encrypted in the TEE based on the encryption key in the first key to obtain the encrypted debugging information, and then the decryption key in the first key is encrypted using the device key to obtain the encrypted first key.

S108: Send the encrypted debugging information and the encrypted first key to the server.

The encrypted debugging information and the encrypted first key can be used to trigger the server to perform abnormality detection on the trusted execution environment of the client device based on the encrypted debugging information and the encrypted first key to determine an abnormality detection result for the trusted execution environment.

In some implementations, since the debugging information of the TEE is important information for tracking and locating the problem of the pipe IE, if the debugging information of the TEE is stolen by a malicious third party, the malicious third party can exploit a vulnerability of the TEE based on the debugging information of the TEE, and attack the TEE of the client device, threatening the security of the TEE of the client device. Therefore, encrypting the debugging information and encrypting the first key can reduce a risk that the debugging information is stolen in the data transmission process, and improve the security of the TEE. In addition, the server can track and locate the problem that occurs in the TEE of the client device in time based on the debugging information, thereby improving the efficiency and accuracy of tracking and locating the problem that occurs in the trusted execution environment of the client device. In addition, a security capability of the server can ensure secure storage of the debugging information of the client device so as to better maintain the TEE of the client device.

Some embodiments of this specification provide a data processing method. The method includes: acquiring a running state of a target application in a trusted execution environment; if it is determined that the target application runs abnormally in the trusted execution environment based on the running state, acquiring a first key and a device key, and debugging information, generated in the trusted execution environment, corresponding to the target application in the trusted execution environment, where the device key is a key generated by a server based on a client device; encrypting the debugging information based on the first key in the trusted execution environment to obtain encrypted debugging information, and encrypting the first key based on the device key to obtain an encrypted first key; and sending the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment. As such, whether the target application runs abnormally can be detected in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 2

Figure 2:
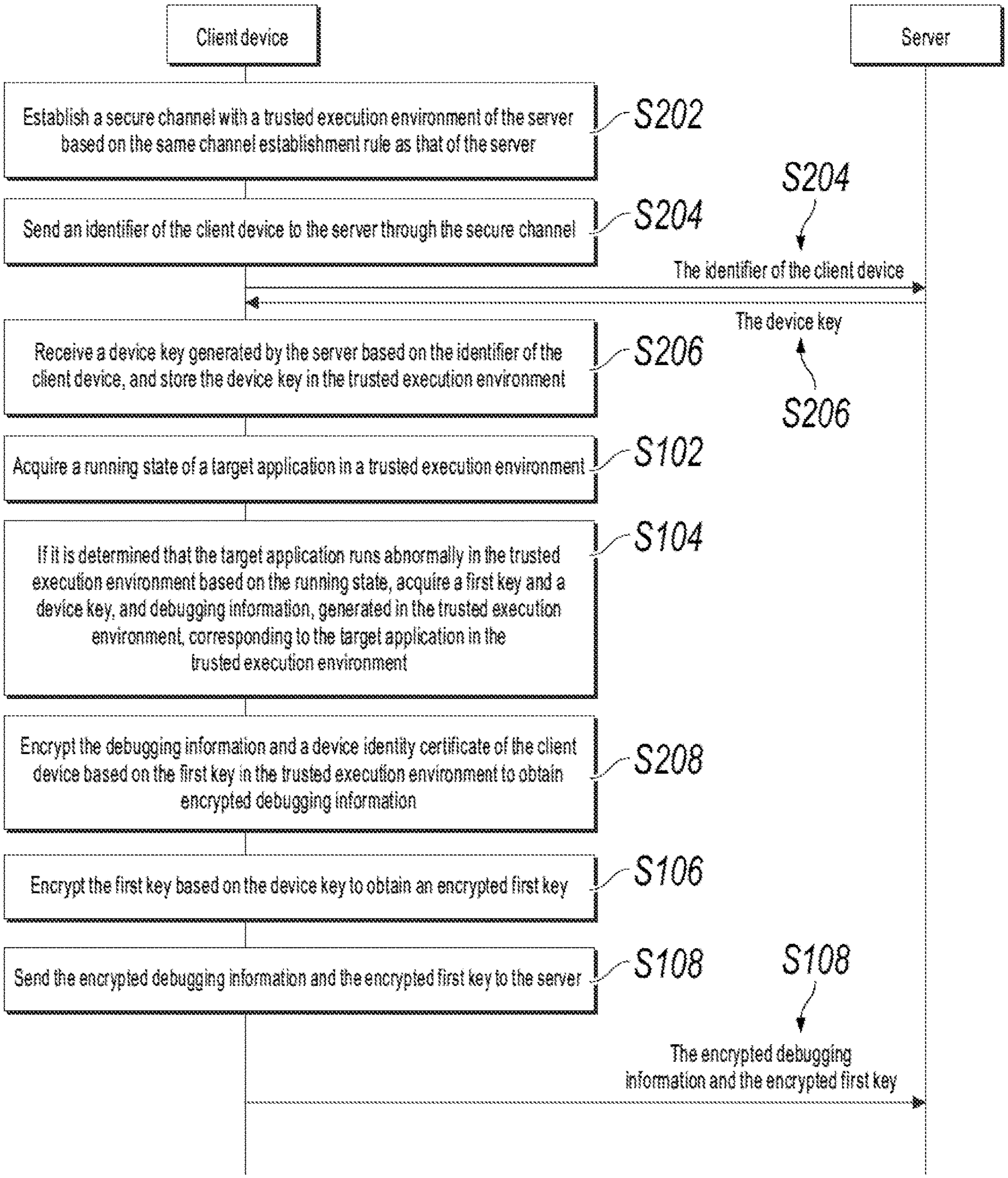
FIG. 2 is a schematic diagram illustrating a processing procedure of another data processing method, according to this specification.

As shown in FIG. 2, some embodiments of this specification provide a data processing method. The method can be performed by a client device, and the client device can be a terminal device. The terminal device can be a mobile terminal device such as a mobile phone or a tablet computer, and the terminal device can include a trusted execution environment (TEE). The method can specifically include the following steps:

S202: Establish a secure channel with a trusted execution environment of the server based on the same channel establishment rule as that of the server.

In some implementations, the server can receive a device authentication request of the client device, where the device authentication request can include device authentication information (used to represent a device identity of the client device) of the client device. The server can perform device authentication on the client device based on the device authentication information, and after the device authentication is completed, acquire the same channel establishment rule as that of the client device and establish a secure channel with the client device.

The above-mentioned method for performing device authentication on the client device is an optional and implementable authentication method. In some actual application scenarios, there can be a plurality of different device authentication methods, which are not specifically limited in some embodiments of this specification.

Figure 3:
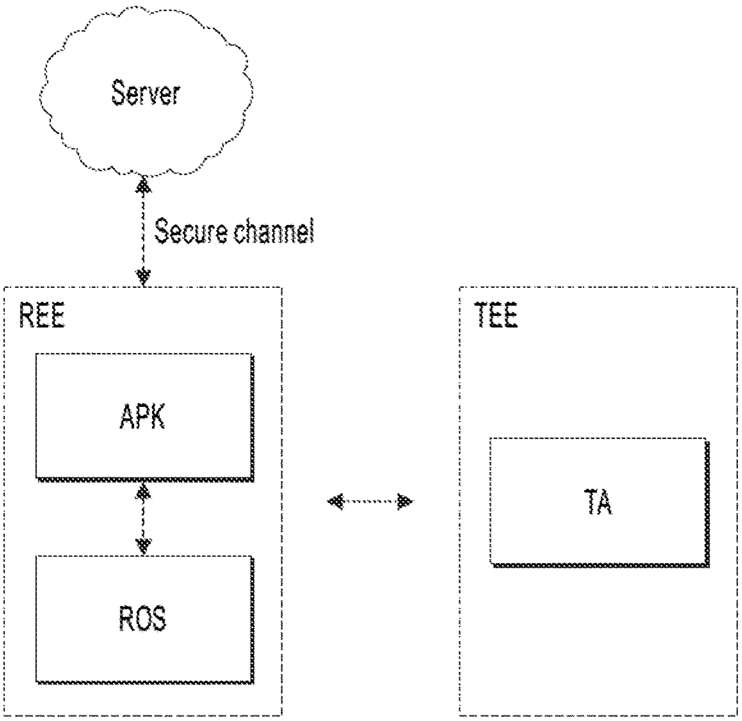
FIG. 3 is a schematic diagram illustrating establishment of a secure channel, according to this specification.

In addition, there can be a plurality of methods for obtaining the same channel establishment rule between the server and the client device. For example, the TEE of the client device can send a plurality of different channel establishment rules to the server, and the server can select one target channel establishment rule from the channel establishment rules and encrypt the target channel establishment rule. The client device can decrypt the encrypted target channel establishment rule to obtain the target channel establishment rule. The client device can establish a secure channel with the server based on the target channel establishment rule. At the same time, as shown in FIG. 3, the server can also establish a secure channel with the client device based on the target channel establishment rule.

S204: Send an identifier of the client device to the server through the secure channel.

The identifier of the client device can be an identifier that can uniquely represent the identity of the client device.

S206: Receive the device key generated by the server based on the identifier of the client device, and store the device key in the trusted execution environment.

In some implementations, the device key of the client device can be generated by the server based on the identifier of the client device, that is, "one key for one device". As such, even if a client device is cracked, it is difficult to cause a security threat to other client devices based on the device key of the cracked client device.

S102: Acquire a running state of a target application in a trusted execution environment.

S104: If it is determined that the target application runs abnormally in the trusted execution environment based on the running state, acquire a first key and a device key, and debugging information, generated in the trusted execution environment, corresponding to the target application in the trusted execution environment.

The device key can be a key generated by the server based on the client device.

S208: Encrypt the debugging information and a device identity certificate of the client device based on the first key in the trusted execution environment to obtain the encrypted debugging information.

The device identity certificate is used to prove that the client device is authentic and credible, and the device identity certificate of the client device can be used to trigger the server to perform device identity authentication on the client device based on the device identity certificate.

In some implementations, if the first key is an asymmetric key, the debugging information and the device identity certificate of the client device can be encrypted by using the encryption key in the asymmetric key to obtain the encrypted debugging information. As such, the server can perform device identity authentication on the client device by using the received device identity certificate of the client device.

S106: Encrypt the first key based on the device key to obtain an encrypted first key.

S108: Send the encrypted debugging information and the encrypted first key to the server.

The encrypted debugging information and the encrypted first key can be used to trigger the server to perform abnormality detection on the trusted execution environment of the client device based on the encrypted debugging information and the encrypted first key to determine an abnormality detection result for the trusted execution environment.

In some implementations, the TEE of the client device can further generate a service key corresponding to the application, and the TEE can sign the debugging information corresponding to the target application and the device identity certificate of the client device by using the service key to obtain first signature information, encrypt the service key by using the device key to obtain an encrypted service key, and then send the encrypted service key and the first signature information to the server through the secure channel. As such, the server performs signature authentication based on the first signature information and the encrypted service key to implement dual authentication of the signature authentication and the device authentication, thereby ensuring the security of data transmission.

Some embodiments of this specification provide a data processing method. The method includes: acquiring a running state of a target application in a trusted execution environment; if it is determined that the target application runs abnormally in the trusted execution environment based on the running state, acquiring a first key and a device key, and debugging information, generated in the trusted execution environment, corresponding to the target application in the trusted execution environment, where the device key is a key generated by a server based on a client device; encrypting the debugging information based on the first key in the trusted execution environment to obtain encrypted debugging information, and encrypting the first key based on the device key to obtain an encrypted first key; and sending the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment. As such, whether the target application runs abnormally can be detected in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 3

Figure 4A:
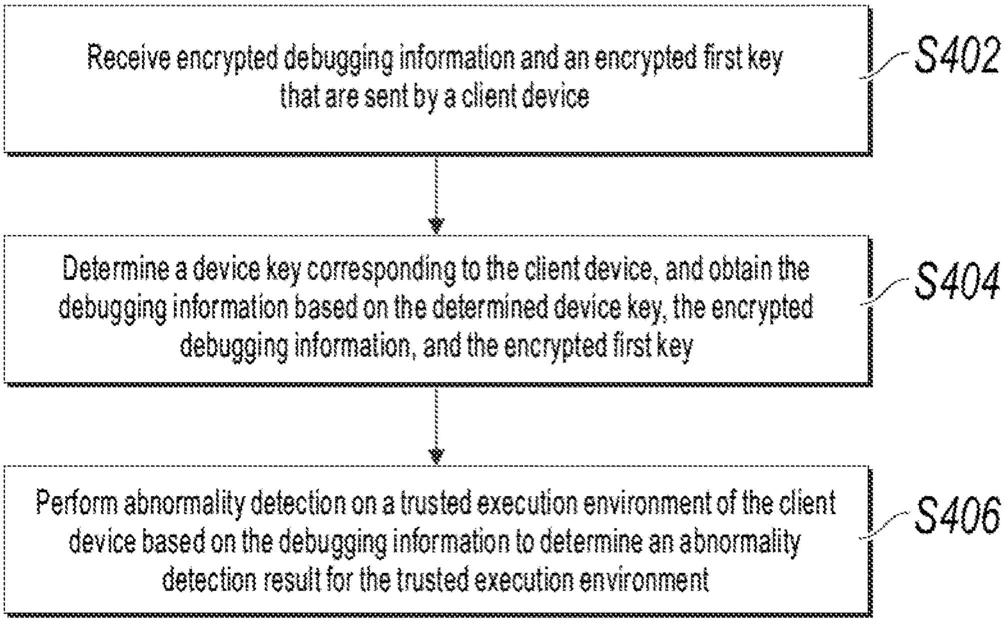
FIG. 4A is a flowchart illustrating another data processing method, according to some embodiments of this specification.
Figure 4B:
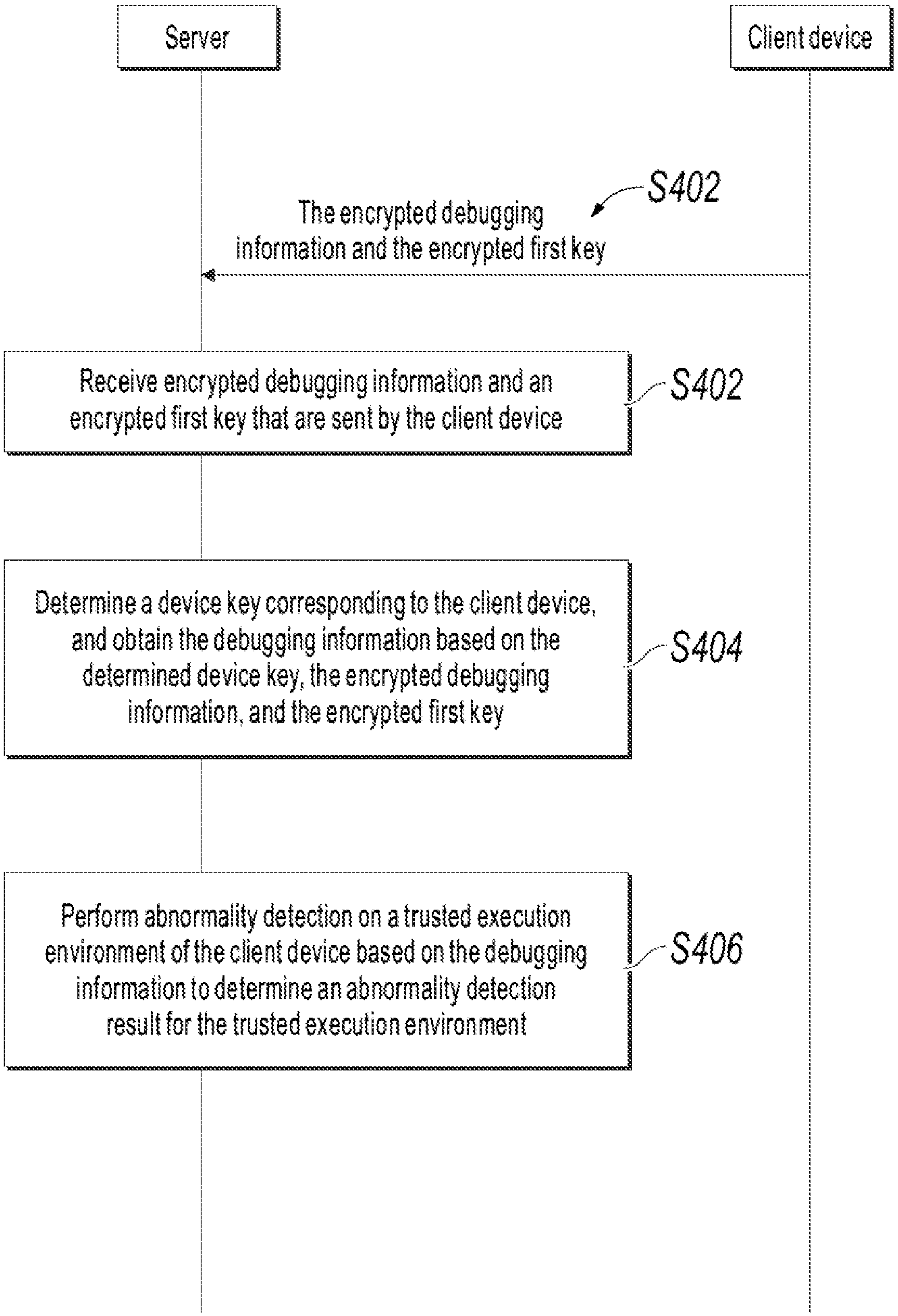
FIG. 4B is a schematic diagram illustrating a processing procedure of another data processing method, according to this specification.

As shown in FIG. 4A and FIG. 4B, some embodiments of this specification provide a data processing method. The method can be performed by a server, the server can be a server, the server can be a server, and the server can be a standalone server, or a server cluster that includes a plurality of servers. The method can specifically include the following steps:

S402: Receive encrypted debugging information and an encrypted first key that are sent by a client device.

The encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device.

S404: Determine the device key corresponding to the client device, and obtain the debugging information based on the determined device key, the encrypted debugging information, and the encrypted first key.

In some implementations, the server can acquire a device key corresponding to the client device from a plurality of device keys stored in advance. The device key can be a symmetric key or an asymmetric key. If the device key is an asymmetric key, the server can decrypt the encrypted first key by using a decryption key in the asymmetric key to obtain the first key, and decrypt the encrypted debugging information by using the first key to obtain the debugging information.

S406: Perform abnormality detection on the trusted execution environment of the client device based on the debugging information to determine an abnormality detection result for the trusted execution environment.

In some implementations, the server can track and locate a problem that occurs in the TEE of the client device based on the debugging information to determine an abnormality detection result for the trusted execution environment.

Some embodiments of this specification provide a data processing method. The method includes: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment. As such, the client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 4

Figure 5:
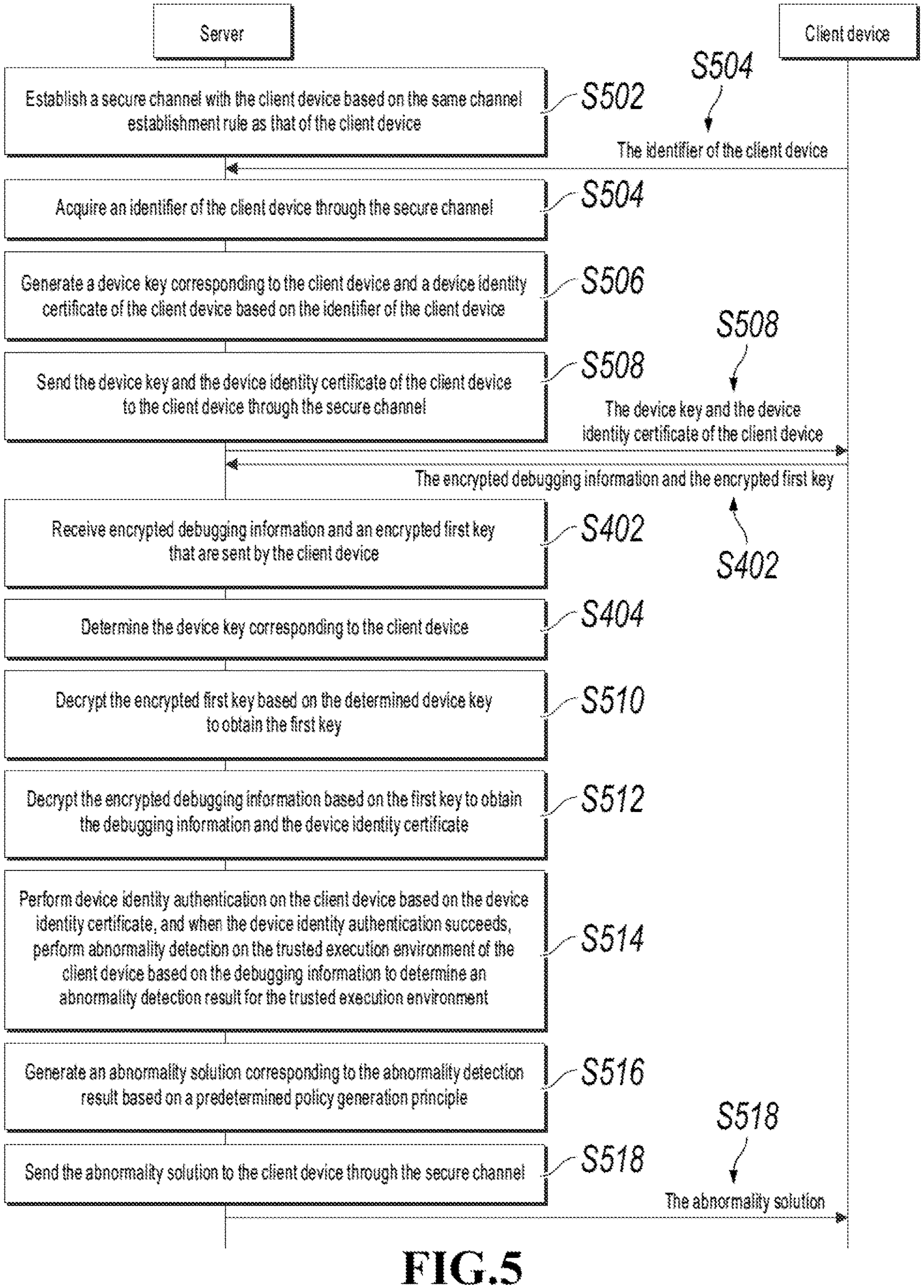
FIG. 5 is a schematic diagram illustrating a processing procedure of another data processing method, according to this specification.

As shown in FIG. 5, some embodiments of this specification provide a data processing method. The method can be performed by a server, and the server can be a standalone server, or a server cluster that includes a plurality of servers. The method can specifically include the following steps:

S502: Establish a secure channel with the client device based on the same channel establishment rule as that of the client device.

In some implementations, for the process of establishing the secure channel between the server and the client device, references can be made to S202 in Embodiment 2, and details are omitted for simplicity.

S504: Acquire an identifier of the client device through the secure channel.

The identifier of the client device can be an identifier that can uniquely represent the identity of the client device.

S506: Generate the device key corresponding to the client device and the device identity certificate of the client device based on the identifier of the client device.

The device identity certificate of the client device can be a certificate for determining a trusted identity of the client device generated by the server based on the device identity information that is sent by the client device through the secure channel.

S508: Send the device key and the device identity certificate of the client device to the client device through the secure channel.

In practice, the processing method of the above-mentioned S508 can alternatively include the following step 1 to step 3.

Step 1: Obtain a channel key predetermined with the client device.

In some implementations, the server can initiate a secure channel establishment request to the TEE of the client device, and in response to the secure channel establishment request, the TEE can generate a session key by using an initial key, generate a TEE authentication code based on the session key, and then encrypt the TEE authentication code based on the session key and send the encrypted TEE authentication code to the server. The server can generate a session key based on the same initial key as that of the TEE, generate a TEE authentication code based on the session key, and perform authentication on the TEE based on the generated TEE authentication code, the generated session key, and the encrypted TEE authentication code sent by the TEE. Similarly, the server can alternatively generate a host authentication code corresponding to the server based on the initial key or the like, and send the host authentication code to the TEE. The TEE can also generate a host authentication code corresponding to the server based on the initial key or the like, and perform authentication on the server based on the received host authentication code and the generated host authentication code.

As such, establishment of the secure channel between the TEE and the server is completed. Since mutual authentication between the server and the TEE of the client device has been completed, the server and the TEE can update the initial channel key (such as the initial channel key derived by the server and the TEE based on the same key generation algorithm) through the secure channel to obtain the channel key for encrypting the data transmitted between the server and the TEE, that is, the TEE and the server can ensure secure sending of the data by using the secure channel key.

In addition, the channel key between the TEE and the server can be a dynamic key, that is, a new channel key can be determined using the above-mentioned method before each data transmission between the TEE and the server. As such, the TEE and the server negotiate a new channel key before each data transmission, and perform data transmission based on the negotiated new channel key, thereby further improving the security of the data transmission.

Step 2: Encrypt the device key and the device identity certificate of the client device based on the channel key to obtain target encryption information.

Step 3: Send the target encryption information to the client device through the secure channel.

The target encryption information can be used to trigger the client device to decrypt the target encryption information in the trusted execution environment to obtain the device key and the device identity certificate of the client device.

In some implementations, the client device can decrypt the target encryption information by using the channel key in the TEE to obtain the device key and the device identity certificate of the client device, and store the device key and the device identity certificate of the client device in the TEE.

S402: Receive encrypted debugging information and an encrypted first key that are sent by a client device.

S404: Determine the device key corresponding to the client device.

S510: Decrypt the encrypted first key based on the determined device key to obtain the first key.

S512: Decrypt the encrypted debugging information based on the first key to obtain the debugging information and the device identity certificate.

S514: Perform device identity authentication on the client device based on the device identity certificate, and when the device identity authentication succeeds, perform abnormality detection on the trusted execution environment of the client device based on the debugging information to determine an abnormality detection result for the trusted execution environment.

In some implementations, the server can acquire a device identity certificate corresponding to the client device from a plurality of stored device identity certificates, and perform device identity authentication on the client device based on the obtained device identity certificate and the device identity certificate obtained through decryption.

If the device identity authentication fails, the server can send predetermined alarm information to the client device. If the device identity authentication succeeds, the server can perform abnormality detection on the trusted execution environment of the client device based on the debugging information to determine an abnormality detection result for the trusted execution environment.

S516: Generate an abnormality solution corresponding to the abnormality detection result based on a predetermined policy generation principle.

The predetermined policy generation principle can be determined based on a historical detection result and a historical solution.

In some implementations, for example, if the abnormality detection result indicates that problem 1 occurs in the TEE of the client device, the solution corresponding to problem 1 can be determined based on a predetermined mapping relationship between the problem and the policy. In other words, the solution can be determined as the abnormality solution corresponding to the abnormality detection result.

Alternatively, keyword extraction can be performed on the abnormality detection result, and an abnormality solution corresponding to the abnormality detection result can be obtained based on an extracted keyword and a pre-trained policy generation model.

The above-mentioned method for determining the abnormality solution is an optional and implementable determination method. In some actual application scenarios, there can be many different determination methods, and different determination methods can be selected based on different actual application scenarios, which is not specifically limited in some embodiments of this specification.

S518: Send the abnormality solution to the client device through the secure channel.

The abnormality solution is used to trigger the client device to perform abnormality solution processing on the trusted execution environment based on the abnormality solution.

In some implementations, the server can encrypt the abnormality solution by using a key to obtain an encrypted abnormality solution, and then send the encrypted abnormality solution to the client device through the secure channel to ensure security in the data transmission process.

After receiving the encrypted abnormality solution, the client device can decrypt the encrypted abnormality solution by using the channel key in the TEE to obtain the abnormality solution, and then perform abnormality solution processing on the TEE based on the abnormality solution.

Some embodiments of this specification provide a data processing method. The method includes: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment. As such, the client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 5

Some embodiments of this specification provide a data processing system. The data processing system can include a client device and a server. The client device can be a terminal device, and the terminal device can be a mobile terminal device such as a mobile phone or a tablet computer. The server can be a standalone server, or a server cluster that includes a plurality of servers.

The client device is configured to acquire a running state of a target application in a trusted execution environment; if it is determined that the target application runs abnormally in the trusted execution environment based on the running state, acquire a first key and a device key, and debugging information, generated in the trusted execution environment, corresponding to the target application in the trusted execution environment, where the device key is a key generated by a server based on a client device; encrypt the debugging information based on the first key in the trusted execution environment to obtain encrypted debugging information, and encrypt the first key based on the device key to obtain an encrypted first key; and send the encrypted debugging information and the encrypted first key to the server.

The server is configured to determine the device key corresponding to the client device, and obtain the debugging information based on the determined device key, the encrypted debugging information, and the encrypted first key; and perform abnormality detection on the trusted execution environment of the client device based on the debugging information to determine an abnormality detection result for the trusted execution environment.

Figure 6:
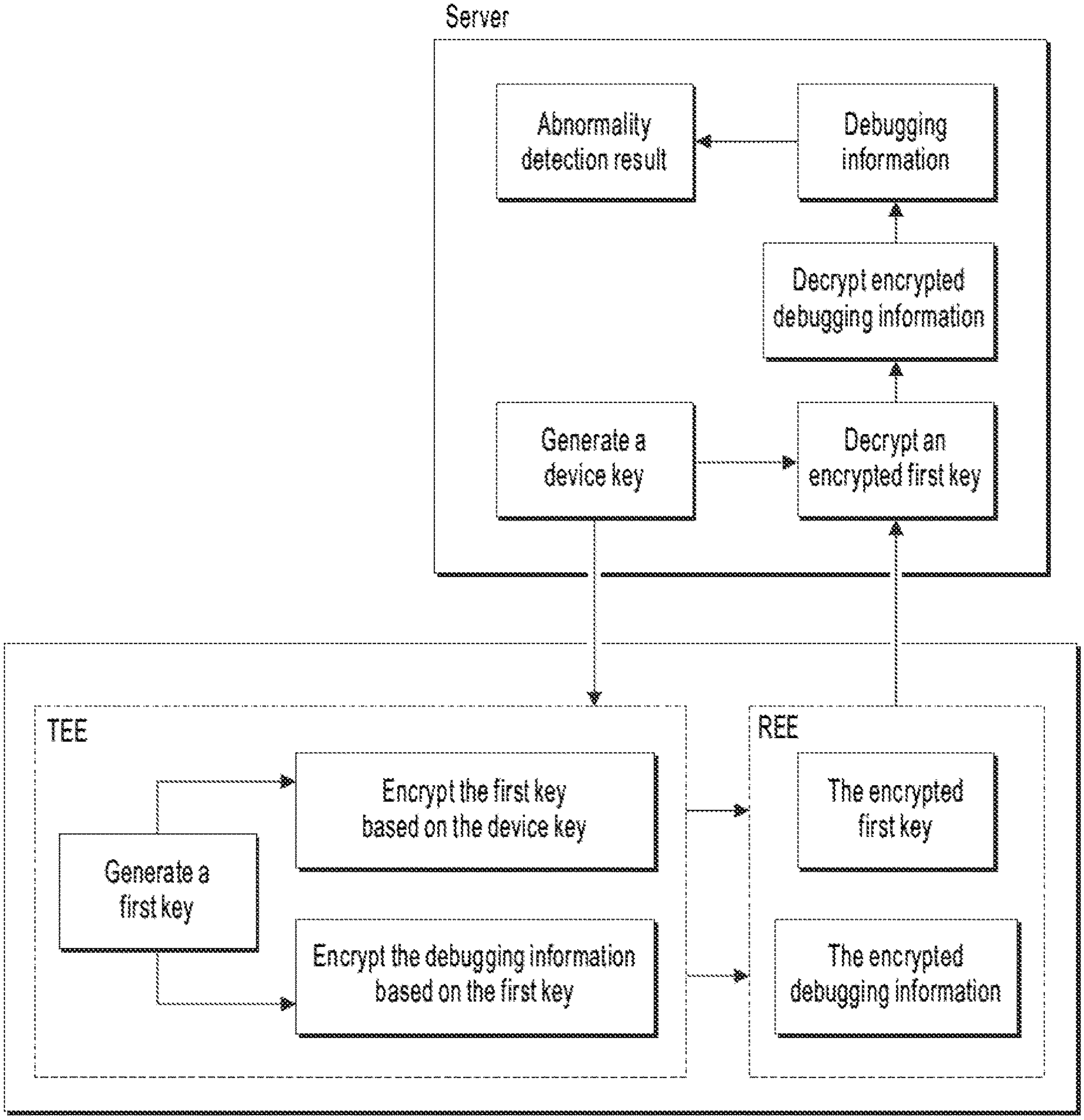
FIG. 6 is a schematic diagram illustrating a data processing system, according to this specification.

In addition, a secure channel can be further established between the server and the client device, and data transmission can be performed based on the secure channel. As such, as shown in FIG. 6, before the debugging information generated by the trusted execution environment of the client device leaves the TEE, the first key generated by the TEE is encrypted in the TEE, and the first key is encrypted using the device key sent by the server. Even if the encrypted debugging information and the encrypted first key are transferred to a non-trusted execution environment before being uploaded to the server, since the data are encrypted, a plaintext of the debugging information cannot be obtained even if the data are stolen by a malicious third party. In addition, the debugging information and the first key are both uploaded to the server after being encrypted so that the server can initiate a decryption process by using a unique device key corresponding to the client device, thereby ensuring uniqueness of each decryption operation of the client device, and providing a high anti-cracking capability for the whole process of the debugging information from the TEE to the server.

Some embodiments of this specification provide a data processing method. The method includes: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment. As such, the client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 6

Figure 7:
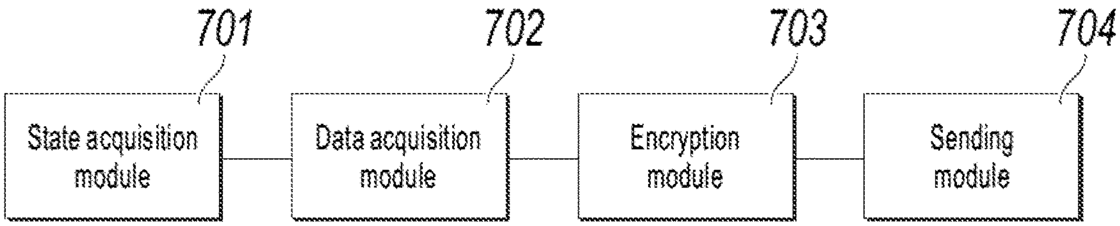
FIG. 7 is a schematic structural diagram illustrating a data processing apparatus, according to some embodiments of this specification.

The data processing method provided in some embodiments of this specification has been described previously. Based on the same idea, some embodiments of this specification further provide a data processing apparatus, as shown in FIG. 7.

The data processing apparatus includes a state acquisition module 701, a data acquisition module 702, an encryption module 703, and a sending module 704.

The state acquisition module 701 is configured to acquire a running state of a target application in a trusted execution environment.

The data acquisition module 702 is configured to: if it is determined that the target application runs abnormally in the trusted execution environment based on the running state, acquire a first key and a device key, and debugging information, generated in the trusted execution environment, corresponding to the target application in the trusted execution environment, where the device key is a key generated by a server based on the client device.

The encryption module 703 is configured to encrypt the debugging information based on the first key in the trusted execution environment to obtain encrypted debugging information, and encrypt the first key based on the device key to obtain an encrypted first key.

The sending module 704 is configured to send the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

In some embodiments of this specification, the apparatus further includes: a channel establishment module, configured to establish a secure channel with a trusted execution environment of the server based on the same channel establishment rule as that of the server; an identifier sending module, configured to send an identifier of the client device to the server through the secure channel; and a key receiving module, configured to receive the device key generated by the server based on the identifier of the client device, and store the device key in the trusted execution environment.

In some embodiments of this specification, the encryption module 703 is configured to: encrypt the debugging information and a device identity certificate of the client device based on the first key in the trusted execution environment to obtain the encrypted debugging information, where the device identity certificate of the client device is used to trigger the server to perform device identity authentication on the client device based on the device identity certificate.

Some embodiments of this specification provide a data processing apparatus. The apparatus is configured to: acquire a running state of a target application in a trusted execution environment; if it is determined that the target application runs abnormally in the trusted execution environment based on the running state, acquire a first key and a device key, and debugging information, generated in the trusted execution environment, corresponding to the target application in the trusted execution environment, where the device key is a key generated by a server based on a client device; encrypt the debugging information based on the first key in the trusted execution environment to obtain encrypted debugging information, and encrypt the first key based on the device key to obtain an encrypted first key; and send the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment. As such, whether the target application runs abnormally can be detected in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 7

Figure 8:
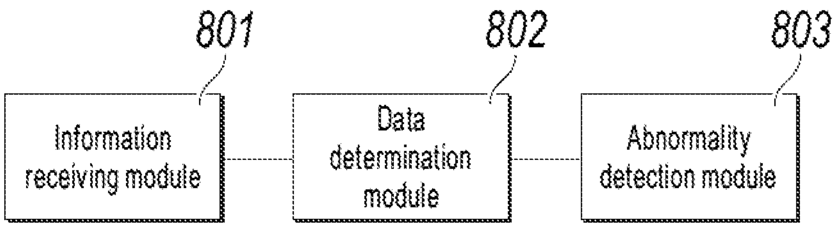
FIG. 8 is a schematic structural diagram illustrating another data processing apparatus, according to some embodiments of this specification.

The data processing method provided in some embodiments of this specification has been described previously. Based on the same idea, some embodiments of this specification further provide a data processing apparatus, as shown in FIG. 8.

The data processing apparatus includes an information receiving module 801, a data determination module 802, and an abnormality detection module 803.

The information receiving module 801 is configured to receive encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device.

The data determination module 802 is configured to determine the device key corresponding to the client device, and obtain the debugging information based on the determined device key, the encrypted debugging information, and the encrypted first key.

The abnormality detection module 803 is configured to perform abnormality detection on the trusted execution environment of the client device based on the debugging information to determine an abnormality detection result for the trusted execution environment.

In some embodiments of this specification, the apparatus further includes: a channel establishment module, configured to establish a secure channel with the client device based on the same channel establishment rule as that of the client device; an identifier acquisition module, configured to acquire an identifier of the client device through the secure channel; a data generation module, configured to generate the device key corresponding to the client device and the device identity certificate of the client device based on the identifier of the client device; and a data sending module, configured to send the device key and the device identity certificate of the client device to the client device through the secure channel.

In some embodiments of this specification, the data sending module is configured to: obtain a channel key predetermined with the client device; encrypt the device key and the device identity certificate of the client device based on the channel key to obtain target encryption information; and send the target encryption information to the client device through the secure channel, where the target encryption information is used to trigger the client device to decrypt the target encryption information in the trusted execution environment to obtain the device key and the device identity certificate of the client device.

In some embodiments of this specification, the data determination module 802 is configured to: decrypt the encrypted first key based on the determined device key to obtain the first key; decrypt the encrypted debugging information based on the first key to obtain the debugging information and the device identity certificate; and the abnormality detection module 803 is configured to: perform device identity authentication on the client device based on the device identity certificate, and when the device identity authentication succeeds, perform abnormality detection on the trusted execution environment of the client device based on the debugging information to determine an abnormality detection result for the trusted execution environment.

In some embodiments of this specification, the apparatus further includes: a policy generation module, configured to generate an abnormality solution corresponding to the abnormality detection result based on a predetermined policy generation principle; and a policy sending module, configured to send the abnormality solution to the client device through the secure channel, where the abnormality solution is used to trigger the client device to perform abnormality solution processing on the trusted execution environment based on the abnormality solution.

Some embodiments of this specification provide a data processing apparatus. The apparatus is configured to: receive encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determine the device key corresponding to the client device, and obtain the debugging information based on the determined device key, the encrypted debugging information, and the encrypted first key; and perform abnormality detection on the trusted execution environment of the client device based on the debugging information to determine an abnormality detection result for the trusted execution environment. As such, the client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 8

Figure 9:
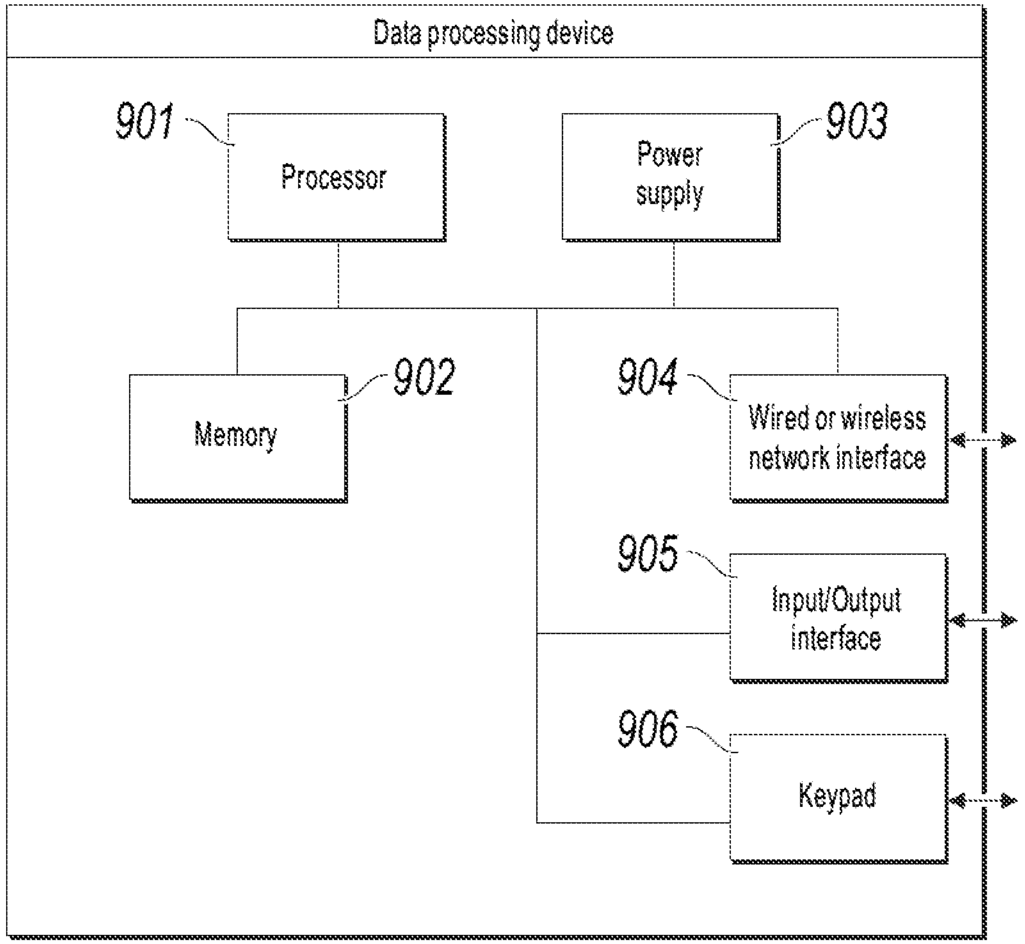
FIG. 9 is a schematic structural diagram illustrating a data processing device, according to this specification.

Based on the same idea, some embodiments of this specification further provide a data processing device, as shown in FIG. 9.

The data processing device can differ greatly because of a difference in configuration or performance, and can include one or more processors 901 and one or more memories 902. The memory 902 can store one or more applications or data. The memory 902 can be a temporary storage or a persistent storage. The application stored in the memory 902 can include one or more modules (not shown in the figure), and each module can include a series of computer-executable instructions in the data processing device. Still further, the processor 901 can be configured to communicate with the memory 902 to execute a series of computer-executable instructions in the memory 902 on the data processing device. The data processing device can further include one or more power supplies 903, one or more wired or wireless network interfaces 904, one or more input/output interfaces 905, one or more keypads 906, etc.

In some specific embodiments, the data processing device includes a memory and one or more programs, where the one or more programs are stored in the memory, and the one or more programs can include one or more modules, and each module can include a series of computer-executable instructions in the data processing device. One or more processors are configured to execute the computer-executable instructions included in the one or more programs to perform the following operations: acquiring a running state of a target application in a trusted execution environment; if it is determined that the target application runs abnormally in the trusted execution environment based on the running state, acquiring a first key and a device key, and debugging information, generated in the trusted execution environment, corresponding to the target application in the trusted execution environment, where the device key is a key generated by a server based on the client device; encrypting the debugging information based on the first key in the trusted execution environment to obtain encrypted debugging information, and encrypting the first key based on the device key to obtain an encrypted first key; and sending the encrypted debugging information and the encrypted first key to the server, where the encrypted debugging information and the encrypted first key are used to trigger the server to perform abnormality detection on the trusted execution environment of the client device based on the encrypted debugging information and the encrypted first key to determine an abnormality detection result for the trusted execution environment.

Optionally, before the acquiring a first key and a device key, and debugging information corresponding to the target application in the trusted execution environment, the following operations are further included: establishing a secure channel with a trusted execution environment of the server based on the same channel establishment rule as that of the server; sending an identifier of the client device to the server through the secure channel; and receiving the device key generated by the server based on the identifier of the client device, and storing the device key in the trusted execution environment.

Optionally, the encrypting the debugging information based on the first key in the trusted execution environment to obtain encrypted debugging information includes: encrypting the debugging information and a device identity certificate of the client device based on the first key in the trusted execution environment to obtain the encrypted debugging information, where the device identity certificate of the client device is used to trigger the server to perform device identity authentication on the client device based on the device identity certificate.

In addition, in some specific embodiments, the data processing device includes a memory and one or more programs, where the one or more programs are stored in the memory, and the one or more programs can include one or more modules, and each module can include a series of computer-executable instructions in the data processing device. One or more processors are configured to execute the computer-executable instructions included in the one or more programs to perform the following operations: receiving encrypted debugging information and an encrypted first key that are sent by a client device, where the encrypted debugging information is obtained by encrypting debugging information, generated in a trusted execution environment of the client device, corresponding to a target application based on the first key in the trusted execution environment when the client device determines that the target application runs abnormally in the trusted execution environment based on a running state of the target application, the encrypted first key is obtained by the server by encrypting the first key based on a device key in the trusted execution environment, and the device key is a key generated by the server based on the client device; determining the device key corresponding to the client device, and obtaining the debugging information based on the determined device key, the encrypted debugging information, and the encrypted first key; and performing abnormality detection on the trusted execution environment of the client device based on the debugging information to determine an abnormality detection result for the trusted execution environment.

Optionally, the encrypted debugging information is obtained by the client device by encrypting the debugging information and a device identity certificate of the client device based on the first key in the trusted execution environment, and before the receiving encrypted debugging information and an encrypted first key that are sent by a client device, the following operations are further included: establishing a secure channel with the client device based on the same channel establishment rule as that of the client device; acquiring an identifier of the client device through the secure channel; generating the device key corresponding to the client device and the device identity certificate of the client device based on the identifier of the client device; and sending the device key and the device identity certificate of the client device to the client device through the secure channel.

Optionally, the sending the device key and the device identity certificate of the client device to the client device through the secure channel includes: obtaining a channel key predetermined with the client device; encrypting the device key and the device identity certificate of the client device based on the channel key to obtain target encryption information; and sending the target encryption information to the client device through the secure channel, where the target encryption information is used to trigger the client device to decrypt the target encryption information in the trusted execution environment to obtain the device key and the device identity certificate of the client device.

Optionally, the obtaining the debugging information based on the determined device key, the encrypted debugging information, and the encrypted first key includes: decrypting the encrypted first key based on the determined device key to obtain the first key; decrypting the encrypted debugging information based on the first key to obtain the debugging information and the device identity certificate; and the performing abnormality detection on the trusted execution environment of the client device based on the debugging information to determine an abnormality detection result for the trusted execution environment includes: performing device identity authentication on the client device based on the device identity certificate, and when the device identity authentication succeeds, performing abnormality detection on the trusted execution environment of the client device based on the debugging information to determine an abnormality detection result for the trusted execution environment.

Optionally, the method further includes: generating an abnormality solution corresponding to the abnormality detection result based on a predetermined policy generation principle; and sending the abnormality solution to the client device through the secure channel, where the abnormality solution is used to trigger the client device to perform abnormality solution processing on the trusted execution environment based on the abnormality solution.

Some embodiments of this specification provide a data processing device. The client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Embodiment 9

Some embodiments of this specification further provide a computer-readable storage medium. The computer-readable storage medium stores a computer program. The computer program is executed by a processor to implement various processes of the above-mentioned data processing method embodiments and achieve the same technical effects. To avoid repetition, details are omitted for simplicity. The computer-readable storage medium includes, for example, a read-only memory (ROM), a random access memory (RAM), a magnetic disk, or an optical disc.

Some embodiments of this specification provide a computer-readable storage medium. The client device can detect whether the target application runs abnormally in time based on the running state of the target application in the trusted execution environment. When the target application runs abnormally, the debugging information, generated in the trusted execution environment, corresponding to the target application can be encrypted and then sent to the server so that the server performs abnormality detection on the trusted execution environment of the client device in time and accurately based on the obtained debugging information, thereby improving the efficiency and accuracy of tracking and locating the problem that occurs in the trusted execution environment of the client device. In addition, the first key and the device key can be encrypted to ensure the security of the debugging information and the like in the data transmission process and reduce a risk that the trusted execution environment is attacked when the debugging information is stolen.

Some specific embodiments of this specification are described previously. Other embodiments fall within the scope of the appended claims. In some cases, actions or steps described in the claims can be performed in a sequence different from that in some embodiments and desired results can still be achieved. In addition, processes described in the accompanying drawings do not necessarily require a specific order or a sequential order shown to achieve the desired results. In some implementations, multi-tasking and concurrent processing are feasible or may be advantageous.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the above-mentioned some embodiments can be implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, during implementation of one or more embodiments of this specification, the functions of each unit can be implemented in one or more pieces of software and/or hardware.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

Some embodiments of this specification are described with reference to at least one of flowcharts or block diagrams of the method, the device (system), and the computer program product according to some embodiments of this specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way so that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which can implement information storage by using any method or technology. Information can be a computer-readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in this specification, the computer-readable medium does not include transitory media such as a modulated data signal and carrier.

It is worthwhile to further note that, the terms "include", "comprise", or any other variant thereof are intended to cover a non-exclusive inclusion so that a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

A person skilled in the art should understand that some embodiments of this specification can be provided as methods, systems, or computer program products. Therefore, one or more embodiments of this specification can use a form of hardware only embodiments, software only embodiments, or embodiments with a combination of software and hardware. In addition, one or more embodiments of this specification can use a form of a computer program product that is implemented on one or more computer-usable storage media (including but not limited to a disk memory, a CD-ROM, an optical memory, etc.) that include computer-usable program code.

One or more embodiments of this specification can be described in the general context of computer-executable instructions, for example, a program module. Generally, the program module includes a routine, a program, an object, a component, a data structure, etc. executing a specific task or implementing a specific abstract data type. One or more embodiments of this specification can alternatively be practiced in distributed computing environments in which tasks are performed by remote processing devices that are connected through a communications network. In the distributed computing environment, the program module can be located in both local and remote computer storage media including storage devices.

Some embodiments of this specification are described in a progressive way. For same or similar parts of the some embodiments, mutual references can be made to the some embodiments. Each embodiment focuses on a difference from other embodiments. Particularly, some system embodiments are briefly described since they are basically similar to some method embodiments. For related parts, references can be made to related descriptions in some method embodiments.

The above-mentioned descriptions are merely some embodiments of this specification and are not intended to limit this specification. A person skilled in the art can make various changes and variations to this specification. Any modification, equivalent replacement, or improvement made without departing from the spirit and principle of this specification shall fall within the scope of the claims in this specification.

The invention claimed is:

1. A data processing method performed in a trusted execution environment of a server, the method comprising:

receiving encrypted debugging information and an encrypted first key from a client device, wherein the encrypted debugging information is obtained for a target application by encrypting debugging information generated in a trusted execution environment of the client device and a device identity certificate of the client device based on a first key, wherein the device identity certificate of the client device is generated based on an identifier of the client device, wherein encrypting the debugging information is performed in response to the client device determining that the target application runs abnormally in the trusted execution environment based on a running state of the target application, wherein the encrypted first key is obtained by encrypting the first key based on a device key generated by the server in the trusted execution environment for the client device;

determining the device key corresponding to the client device;

obtaining the debugging information based on the device key, the encrypted debugging information, and the encrypted first key; and performing abnormality detection on the trusted execution environment of the client device based on the debugging information to determine an abnormality detection result for the trusted execution environment, wherein before receiving the encrypted debugging information and the encrypted first key, the method further comprising:

establishing a secure channel with the client device based on a same channel establishment rule shared by the server and the client device;

obtaining the identifier of the client device through the secure channel;

generating the device key corresponding to the client device based on the identifier of the client device; and sending the device key and the device identity certificate of the client device to the client device through the secure channel.

2. The method according to claim 1, wherein sending the device key and the device identity certificate of the client device to the client device comprises:

obtaining a channel key predetermined for the client device;

encrypting the device key and the device identity certificate of the client device based on the channel key to obtain target encryption information; and sending the target encryption information to the client device through the secure channel to trigger the client device to decrypt the target encryption information in the trusted execution environment to obtain the device key and the device identity certificate of the client device.

3. The method according to claim 2, wherein obtaining the debugging information comprises:

decrypting the encrypted first key based on the device key to obtain the first key; and decrypting the encrypted debugging information based on the first key to obtain the debugging information and the device identity certificate; and wherein performing abnormality detection on the trusted execution environment of the client device comprises:

performing device identity authentication on the client device based on the device identity certificate; and in response to the device identity authentication being successful, performing the abnormality detection on the trusted execution environment of the client device based on the debugging information.

4. The method according to claim 3, wherein the method further comprises:

generating an abnormality solution corresponding to the abnormality detection result based on a predetermined policy generation principle; and sending the abnormality solution to the client device through the secure channel for triggering the client device to perform abnormality solution processing on the trusted execution environment.

5. A server comprising:

at least one processor; and one or more memories coupled to the at least one processor and storing programming instructions for execution by the at least one processor to perform, in a trusted execution environment, operations comprising:

receiving encrypted debugging information and an encrypted first key from a client device, wherein the encrypted debugging information is obtained for a target application by encrypting debugging information generated in a trusted execution environment of the client device and a device identity certificate of the client device based on a first key, wherein the device identity certificate of the client device is generated based on an identifier of the client device, wherein encrypting the debugging information is performed in response to the client device determining that the target application runs abnormally in the trusted execution environment based on a running state of the target application, wherein the encrypted first key is obtained by encrypting the first key based on a device key generated by the server in the trusted execution environment for the client device;

determining the device key corresponding to the client device;

obtaining the debugging information based on the device key, the encrypted debugging information, and the encrypted first key; and performing abnormality detection on the trusted execution environment of the client device based on the debugging information to determine an abnormality detection result for the trusted execution environment, wherein before receiving the encrypted debugging information and the encrypted first key, the operations further comprising:

establishing a secure channel with the client device based on a same channel establishment rule shared by the server and the client device;

obtaining the identifier of the client device through the secure channel;

generating the device key corresponding to the client device based on the identifier of the client device; and sending the device key and the device identity certificate of the client device to the client device through the secure channel.

6. The server according to claim 5, wherein sending the device key and the device identity certificate of the client device to the client device comprises:

obtaining a channel key predetermined for the client device;

encrypting the device key and the device identity certificate of the client device based on the channel key to obtain target encryption information; and sending the target encryption information to the client device through the secure channel to trigger the client device to decrypt the target encryption information in the trusted execution environment to obtain the device key and the device identity certificate of the client device.

7. The server according to claim 6, wherein obtaining the debugging information comprises:

decrypting the encrypted first key based on the device key to obtain the first key; and decrypting the encrypted debugging information based on the first key to obtain the debugging information and the device identity certificate; and wherein performing abnormality detection on the trusted execution environment of the client device comprises:

performing device identity authentication on the client device based on the device identity certificate; and in response to the device identity authentication being successful, performing the abnormality detection on the trusted execution environment of the client device based on the debugging information.

8. The server according to claim 7, wherein the operations further comprising:

generating an abnormality solution corresponding to the abnormality detection result based on a predetermined policy generation principle; and sending the abnormality solution to the client device through the secure channel for triggering the client device to perform abnormality solution processing on the trusted execution environment.

9. A non-transitory, computer-readable medium storing one or more instructions executable by at least one processor in a trusted execution environment of a server, to perform operations comprising:

receiving encrypted debugging information and an encrypted first key from a client device, wherein the encrypted debugging information is obtained for a target application by encrypting debugging information generated in a trusted execution environment of the client device and a device identity certificate of the client device based on a first key, wherein the device identity certificate of the client device is generated based on an identifier of the client device, wherein encrypting the debugging information is performed in response to the client device determining that the target application runs abnormally in the trusted execution environment based on a running state of the target application, wherein the encrypted first key is obtained by encrypting the first key based on a device key generated by the server in the trusted execution environment for the client device;

determining the device key corresponding to the client device;

obtaining the debugging information based on the device key, the encrypted debugging information, and the encrypted first key; and performing abnormality detection on the trusted execution environment of the client device based on the debugging information to determine an abnormality detection result for the trusted execution environment, wherein before receiving the encrypted debugging information and the encrypted first key, the operations further comprising:

establishing a secure channel with the client device based on a same channel establishment rule shared by the server and the client device;

obtaining the identifier of the client device through the secure channel;

generating the device key corresponding to the client device based on the identifier of the client device; and sending the device key and the device identity certificate of the client device to the client device through the secure channel.

10. The non-transitory, computer-readable medium according to claim 9, wherein sending the device key and the device identity certificate of the client device to the client device comprises:

obtaining a channel key predetermined for the client device;

encrypting the device key and the device identity certificate of the client device based on the channel key to obtain target encryption information; and sending the target encryption information to the client device through the secure channel to trigger the client device to decrypt the target encryption information in the trusted execution environment to obtain the device key and the device identity certificate of the client device.

11. The non-transitory, computer-readable medium according to claim 10, wherein obtaining the debugging information comprises:

decrypting the encrypted first key based on the device key to obtain the first key; and decrypting the encrypted debugging information based on the first key to obtain the debugging information and the device identity certificate; and wherein performing abnormality detection on the trusted execution environment of the client device comprises:

performing device identity authentication on the client device based on the device identity certificate; and in response to the device identity authentication being successful, performing the abnormality detection on the trusted execution environment of the client device based on the debugging information.

12. The non-transitory, computer-readable medium according to claim 11, wherein the operations further comprising:

generating an abnormality solution corresponding to the abnormality detection result based on a predetermined policy generation principle; and sending the abnormality solution to the client device through the secure channel for triggering the client device to perform abnormality solution processing on the trusted execution environment.

* * * * *